Jan. 12, 1937. T. A. MITCHELL 2,067,778
METHOD OF TREATING COMPLEX LEAD BEARING ORE MATERIALS
Filed July 3, 1935
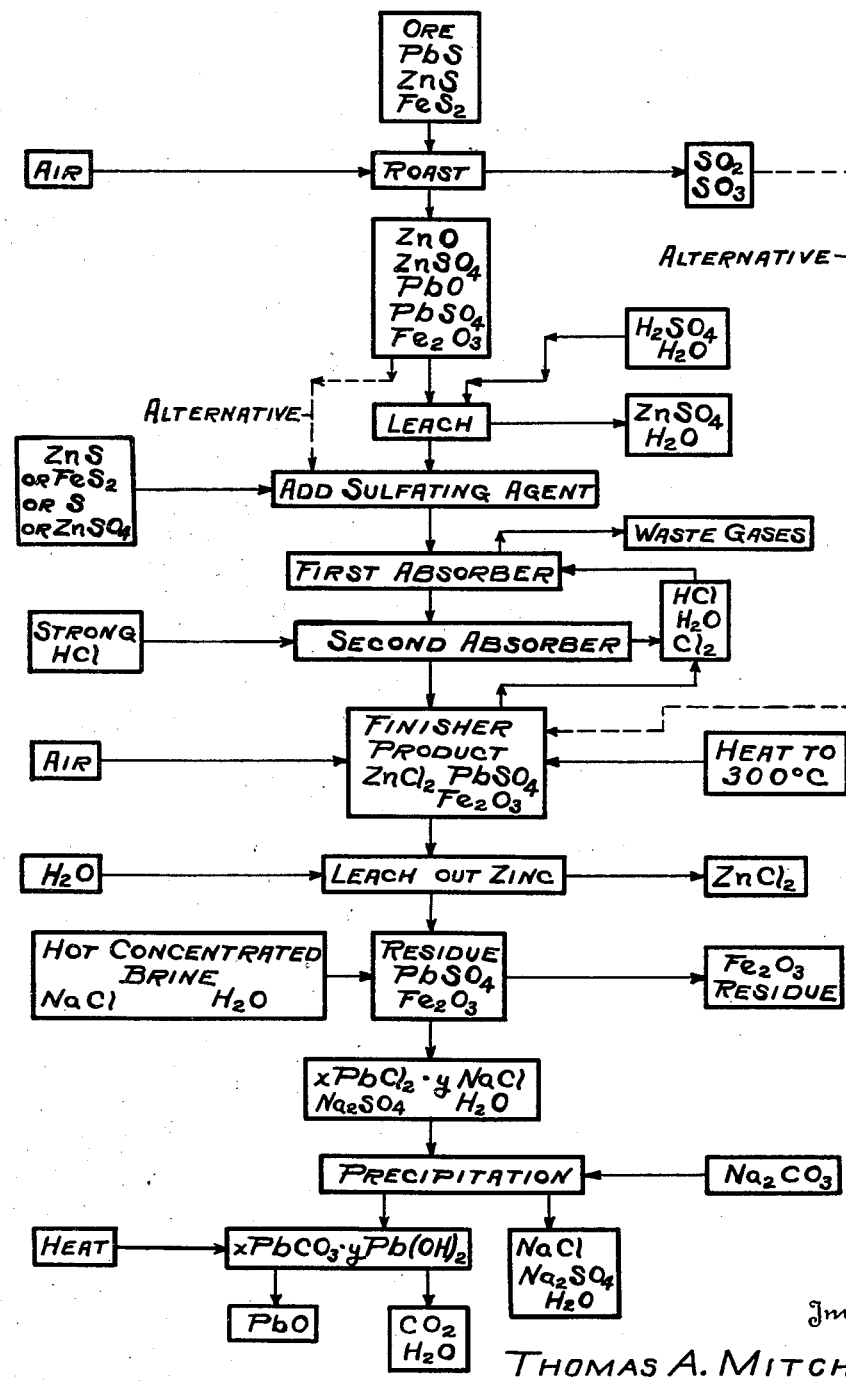
Inventor
THOMAS A. MITCHELL
By Clayton H. Jenks
Attorney Patented Jan. 12, 1937

2,067,778

UNITED STATES PATENT OFFICE 2,067,778

METHOD OF TREATING COMPLEX LEAD BEARING ORE MATERIALS

Thomas A. Mitchell, Inglewood, Calif., assignor to Hughes-Mitchell Processes, Incorporated, Denver, Colo., a corporation of Wyoming Application July 3, 1935, Serial No. 29,643

9 Claims. (Cl. 75—110)

This invention relates to a method of treating complex lead bearing ore materials, and more particularly to a chloridizing process for treating a roasted complex sulfide ore, such as one containing lead and zinc or other metal sulfides, in which the lead is recovered as a sulfate and the other metals as chlorides.

A lead sulfide ore may be so treated as to form lead sulfate or lead chloride, and these may be dissolved in a hot sodium chloride brine and precipitated therefrom as a carbonate, hydroxide or other desired compound. If, however, lead oxide is present in the ore material to be leached with the hot brine, this treatment results in a reaction of the sodium chloride and lead oxide to form the insoluble lead hydroxychloride which would remain with the ore residue at the end of the leaching operation and thus be lost.

A preferred procedure for treating a complex lead and zinc sulfide ore involves roasting the ore under low temperature oxidizing conditions which serve to convert the zinc sulfide to the oxide or sulfate; but a satisfactory roasting of the zinc sulfide will oxidize the lead sulfide in part to the sulfate but leave a considerable amount of the lead as an oxide. Such an operation may, in fact, result in more than 50% of the total lead content being present as lead oxide. It will, therefore, be appreciated that the lead content of such a roasted ore material cannot be satisfactorily recovered by a salt brine leaching operation after the soluble zinc compounds have been removed.

If a complex roasted ore as thus produced contains a considerable amount of refractory or difficultly solubilized compounds, such as zinc sulfide, ferrite or silicate, these refractory compounds may be readily chloridized by a suitable operation, such as by treating the ore material, either in an aqueous bath or in a substantially dry condition, with chlorine gas or other suitable reagent or by heating it with ferric or ferrous chloride or other chloridizing salt, or by a combination of both. A preferred procedure for this chloridizing operation is set forth in the patent to Mitchell No. 1,979,281, wherein the roasted ore containing zinc oxide and/or sulfate, together with the refractory zinc and lead compounds, lead oxide and lead sulfate, are subjected to a series of chloridizing steps in which the readily chloridized zinc oxide is first converted to chloride by treatment with residual gases, after which the ore material in intermixture with ferric oxide is subjected to strong hydrochloric acid gas at a low temperature wherein crystalline hydrated ferric chloride is formed within the ore material. Thereafter, the mixture is heated to a temperature, such as 250° to 350° C., and in the presence of oxygen in excess, so that the ferric chloride is decomposed with an evolution of nascent chlorine and the formation of ferric oxide. In such processes, the lead oxide resulting from the roasting operation is chloridized to a considerable extent with an expensive consumption of chlorine, as is required to convert the lead oxide to the chloride. Lead oxide and/or chloride are likewise present in the products of other chloridizing processes, and particularly where ferrous and/or ferric chloride are formed in or added to the ore material or chlorine gas or hydrochloric acid are added or formed in situ, so that the refractory zinc values of such a complex ore may be converted to the chloride.

Since lead sulfate and chloride are readily soluble in a hot sodium chloride or other salt brine and the lead content of an ore may thus be removed economically and efficiently, it is, therefore, desirable that the chloridizing process which is required to solubilize refractory zinc values, should be so carried on that the lead in the final product remains as lead sulfate or lead chloride but not as lead oxide to any considerable extent; and to avoid an unnecessary consumption of chloride, it is preferable that the lead content of the ore product be largely in the sulfate form.

The primary object of this invention is, therefore, to so chloridize a complex ore material containing a lead compound that the lead may be recovered primarily as a sulfate, which is readily soluble in a hot salt brine, and the presence of lead oxide in the ore material is minimized.

A further object comprises the treatment of a complex lead and zinc sulfide ore by a procedure involving chloridization of a part or all of the zinc content of the ore, which leaves the lead in the final product largely as a sulfate, whereby the consumption of chlorine by the lead is avoided. Other objects will be apparent in the following disclosure.

The primary objects of this invention are accomplished by roasting this sulfide ore to remove sulfide sulfur and then chloridizing it in the presence of a sulfating reagent which will prevent the major portion of the lead oxide present in the roasted material from being chloridized and will insure its conversion to lead sulfate. Of the various reagents suitable for this purpose, one may use the sulfide or the sulfate of a metal other than lead, such as iron or zinc sulfide or iron or zinc sulfate, which are capable of converting lead oxide to the sulfate under the conditions of the process; or one may employ sulfuric acid or its anhydride sulfur trioxide, or sulfur dioxide gas or elemental sulfur together with suitable agents capable of oxidizing the same to provide sulfur trioxide or the sulfate radical for combination with lead. Also, ore material containing one or more of these reagents may also be used. For instance, one may add more of the raw sulfide ore to the roasted product prior to the chloridization, or it may be so roasted as to leave the required sulfide content, or an ore containing a high content of iron pyrite may be used or added. Also, a sufficient content of zinc sulfate or other sulfate as formed during the roasting may be left in the ore material to be chloridized or they may be added from outside sources. It is also feasible to use the roasting gases containing sulfur dioxide and sulfur trioxide which may be returned to the process under such conditions as will insure the conversion of lead oxide in the ore material to lead sulfate. It is to be observed that sulfur dioxide in the presence of ferric oxide acting as a catalyzer may be converted to sulfur trioxide and thus be available for sulfating the lead. Likewise, sulfur will burn under the conditions of the process and form similar sulfur oxygen gases. Hence, this process involves the chloridization of the zinc content of the complex ore material in the presence of a sulfating agent which is capable of preventing lead oxide from being chloridized and which will insure that the lead remains in the final product largely as a sulfate.

Although this invention applies broadly to various chloridizing processes for treating complex lead bearing ore materials, it will be specifically described with particular reference to the process set forth in said Mitchell Patent No. 1,979,281. The accompanying drawing shows as a flow diagram a procedure which will insure the attainment of the above objects in the Mitchell treatment of a complex ore containing lead, zinc and iron sulfides.

In accordance with this procedure, it is proposed to roast a complex ore containing lead, zinc and iron sulfides, and which may contain various other sulfides, such as those of silver, and copper, and thus convert the major portion of the zinc to a readily soluble compound. This roasting operation may be carried on in accordance with suitable conditions which prevent sintering of the ore material and leave it in a porous, powdered or gas-permeable condition. This operation may comprise roasting the raw sulfide ore in a finely divided or granular condition with excess of air and suitable low temperature conditions, and preferably not much above that temperature at which the sulfides will burn autogenously, although wide variations in temperature are permissible. This roasting step results in the formation of lead sulfate and oxide, if the temperature is held below the decomposition point of lead sulfate, and the production of zinc oxide and/or zinc sulfate from the zinc sulfide of the ore. If desired, the procedure set forth in the Mitchell Patent No. 1,838,857 may be employed. It is also desirable to roast to a low sulfide content, but a considerable amount, such as 1 to 5%, of zinc and lead sulfides may be left in the ore material, since this sulfide sulfur is readily removed during the subsequent chloridizing stages. The roasting operation may be carried on continuously in suitable apparatus, such as a long rotary tube or a standard shelf type of apparatus, wherein the ore material is agitated and moved along through the roasting zone while heated with air to remove the sulfide sulfur as sulfur dioxide and trioxide gases. This roasting operation may be so conducted that desired proportions of lead oxide and lead sulfate are formed, but the oxide may comprise the major portion of the lead content since it will be taken care of during the later stages of the process.

If the roasting step has been so carried on as to produce a considerable amount of zinc sulfate, then this may be readily removed and recovered by the simple operation of leaching it from the roaster product by means of water. Likewise, zinc oxide may be leached out by means of dilute hydrochloric or sulfuric acids. If both the oxide and sulfate are present, sulfuric acid is used. It is preferable not to leach out all of the zinc oxide, since the presence of this compound tends to prevent the ferric oxide from being dissolved in the acid leach.

Thereafter, the residue, which may be dried to a suitable water content, as desired, is subjected to a chloridizing treatment to chloridize the remainder of the zinc content of the ore. This may be done by numerous chloridizing procedures, such as by forming ferrous and/or ferric chloride in the ore material and then heating the same to a temperature at which the iron chloride is decomposed in the presence of water and/or air to form hydrochloric acid and/or chlorine gas. If ferrous chloride is to be employed, the roasted ore may be so treated in a reducing operation as to form ferrous oxide which will be converted to ferrous chloride by various reagents, as is disclosed in the prior art. Other treatments comprise heating the ore material with chlorine gas or with hydrochloric acid gas or aqueous solution to convert to chlorides such values as are attacked thereby.

In accordance with the procedure illustrated in the drawing, it is preferable to pass this pulverulent or granular ore material, whether or not it has been leached to remove zinc oxide and/or zinc sulfate, through a series of chloridizing apparatus herein termed the first and second absorbers and the finisher, as is more fully described in the prior patents to Mitchell, and particularly No. 1,979,281. In accordance with this procedure, the leached ore material may be dried to a very low content of moisture, such as 5% or lower, and it is then treated in the first absorber with residual chloridizing gases from the other zones of the apparatus so as to convert to the chloride such zinc oxide as is present. The temperature in this first absorber zone and the rate of gas flow are such as to keep the ore material substantially dry and granular or pulverulent in nature so that the gas may readily permeate the same. A temperature of 80° C. is found to be satisfactory for many types of ore. It, however, is important in that process, if the zinc chloride content is high, that the temperature of the gases be above their dew point so as to prevent the condensation of moisture and the dissolving of the deliquescent zinc chloride, which would otherwise tend to form a syrupy condition within the ore material and prevent passage of the gases readily therethrough.

From this first absorber the ore material is passed through a suitable valve to the second absorber where it is treated with strong hydrochloric acid gas in the absence of any material amount of air or other contaminating agents. The temperature in this zone may be below 90° C., and it is preferably held at that point at which ferric chloride, and preferably crystalline hydrated ferric chloride, will be readily formed under the conditions of the process. During the roasting operation, the iron sulfide present in the ore material or added for the purpose is roasted by preference to ferric oxide, although for some types of chloridizing processes the iron oxide may be subjected to a reducing treatment to leave it as ferrous oxide whereby during the chloridizing step it will be converted to ferrous chloride. However, in the preferred process, ferric oxide is present in the roasted ore material or added in sufficient amount to insure the formation of a large quantity of ferric chloride in this second absorber, and which is sufficient to effect the chloridization of the residual zinc compounds, as is required. It is found that in the presence of this crystalline hydrated ferric chloride and the strong hydrochloric acid gas employed, a considerable amount of the refractory zinc compounds are converted to chlorides during this cold zone treatment, with a resultant formation of ferrous chloride. Also, it is found that lead oxide tends to be converted to the chloride during the absorber treatments; but this chloride is converted to the sulfate during the finisher step, as hereafter explained. The ore material coming from this absorber is dry and granular in character because the water of reaction has been taken up by the iron chlorides as water of crystallization.

Thereafter, the ore material is passed through another valve to the top of the finisher, which preferably comprises a long rotary tube or a shelf type of apparatus, wherein the material is stirred and moved progressively from the upper cool end to a lower hot end where heat and air are introduced. The temperature at the lower end may be from 250° to 350° C. or higher if desired, and oxygen or air is introduced in quantity sufficient to insure the oxidation of all of the iron compounds in the ore. When the ore material containing the hydrated iron chlorides enters the finisher, the water of crystallization is removed by evaporation, and this water and the residual gases from the finisher are conveyed around the second absorber to the first absorber where the chlorine content thereof is employed to chloridize the zinc oxide. Likewise, the residual hydrochloric acid gas from the second absorber is passed to the first absorber, as illustrated.

As the material moves downwardly in the finisher and the temperature rises, the iron chloride decomposes and in the presence of oxygen and a minimum of water vapor, the latter having already been removed from contact with the ore material by the ascending air current, the chlorine content of the ferric chloride forms chlorine gas and not hydrochloric acid. The process may, however, be so conducted as to hold the water vapor in the ore material so as to cause the chlorine to form hydrochloric acid. For example, the steam may be condensed in the downwardly moving ore material and thus be trapped in the finisher, or steam or water may be introduced for the purpose. Nascent chlorine is preferred as it is a powerful chloridizing agent and attacks such refractory zinc compounds as remain and converts them to chlorides. The iron oxide formed by decomposition of the ferric and ferrous chlorides appears largely as ferric oxide, which is an insoluble compound in the subsequent leaching operations and thus goes with the residue.

During this process, as thus described, and in similar processes, the lead sulfate formed during the roasting operation goes through the chloridizing operation as such and is not converted to a chloride. On the other hand, the lead oxide formed during roasting is converted to a considerable extent to lead chloride, although some of the lead of the finisher product may remain as lead oxide. A primary feature of this invention involves so treating the ore material that the presence of lead oxide and lead chloride in the finisher product is minimized. Therefore, in accordance with this invention, it is proposed to add a sulfating agent, as above described, which will prevent lead oxide from appearing in any large quantity in the finisher product and will convert lead chloride to the sulfate. This sulfating reagent is preferably used in the form of iron sulfide or iron pyrite. It is preferably added in a finely divided or granular condition after the roasting operation and after leaching the soluble zinc compounds from the roast, if this has been done, although it may be added at any suitable stage of the chloridizing process, such as at the top entrance end of the finisher. One may add zinc or other sulfate capable of giving up its sulfate radical to lead during the process. Likewise, elemental sulfur may be mixed with the ore material after the roasting step. The initial roasting steps may be so carried on as to form elemental sulfur which is thus made available for the process, as is well known. Zinc sulfide may be added if the zinc content of the ore is not already high enough. Also, as indicated, the sulfur oxygen gases from the roaster may be introduced into the lower end of the finisher together with the air. In the presence of ferric oxide acting as a catalyzer and under the high temperature conditions employed in the finisher, the sulfur trioxide added for the purpose or derived from the sulfur or the zinc or iron sulfate or sulfide will form available sulfate radical for combination with the lead. The chemical processes which take place are presumably aided by the chloridizing gases present, such as by the chloridization of the elemental sulfur or the sulfide sulfur content of the iron pyrite to form sulfur chloride, which in turn is oxidized by the air to sulfur dioxide and then in the presence of the catalyzer to sulfur trioxide. Whatever may be the chemical reactions which take place, the net result is the sulfating of the lead oxide and/or chloride. Likewise, if zinc sulfate in the required amount has been left in the ore material or added thereto, the lead preferentially combines with the sulfate radical thereof and by this reaction leaves the zinc free for chloridization so that it appears in the finisher product as zinc chloride. Any zinc sulfide added to the ore material for this sulfating purpose will, of course, be converted by the chloridizing agents to zinc chloride, just the same as is the residual zinc sulfide in the roasted ore. Other sulfating reagents will react in similar ways.

It is desirable that the sulfating reagent be present in sufficient amount to sulfate substantially all of the lead oxide and chloride, and for this purpose, one may add the reagent in the stoichiometric proportions of available sulfur trioxide or sulfate radical thus provided relative to the initial lead oxide content, as determined by analyses of the material going to the chloridizing apparatus and the exit gases.

It is desirable in some cases, and especially where silver is present, that the sulfating reagent be not used in excess, and it may even be deficient for the reaction so as to insure that there is no sulfide sulfur in the finisher product. Various other alternative procedures will now be apparent in view of the above disclosure, and one who employs other types of chloridizing processes than that specifically described herein will understand readily how to prevent the appearance of lead oxide in the chloridized product and insure that the lead is present as a sulfate although other metals to be recovered are converted to chlorides.

The finisher operation or subsequent treatment is so carried on that the iron is present as ferric oxide and is thus insoluble in the leaching solution used. The first leaching operation is that of removing the zinc chloride. This is accomplished by means of water and which may be acidulated to a slight extent with hydrochloric acid. Various standard procedures may be adopted for the purpose. All of the zinc chloride present therein is to be dissolved and the strength of solution will be determined by the amount of water used. Thereafter, the ore is thoroughly washed with water to remove any residual zinc salts and the material is then ready for extraction of the lead by means of an alkali metal chloride brine, and preferably a concentrated water solution of sodium chloride. This is preferably accomplished by treatment with a substantially saturated aqueous solution of sodium chloride at a temprature of 75° C. or other suitable temperature, and the brine is preferably neutral in its reaction. Thereafter, this salt brine may be suitably treated for purification and precipitation of the lead. Sodium carbonate may, for example, be added to the brine to precipitate the lead as a basic carbonate of variable formula, and this carbonate after suitable treatment may be calcined to form lead oxide and $CO_2$. The NaCl and $Na_2SO_4$ will go with the filtrate. Various other treatments for the lead salt brine may, of course, be employed.

It will now be apparent that substantially all of the lead in the raw ore may be converted to the sulfate, although it is not detrimental if the process be so carried on that lead chloride also appears, since both are readily soluble in the hot salt brine. Also, although the process has been described with specific reference to a zinc ore, it is to be understood that it applies equally well to ores or mixtures thereof which contain other values, and suitable modifications of the process for treating such ores will be apparent. The process, of course, applies to a complex ore mixture containing lead oxide derived from any source, where it is desired to recover the lead as a sulfate and another metal value as a chloride. It also applies to ores or mixtures containing lead carbonate, which will be converted to lead sulphate under the conditions of the process. The carbonate is to be considered as the equivalent of the oxide, from the broader aspects of the invention.

It is also to be understood that such sulfur oxygen gases as escape from the chloridizing zone are not available in the sense of the word as here used in the expression "available sulfate radical", and that the amount of sulfur bearing reagent to be used will depend upon the conditions of the process as can be readily determined by observation and analysis of the ore materials before and after chloridization. Hence, the reference to stoichiometric proportions must be interpreted broadly. Also, it is to be understood that the expression "sulfate radical" as used in the claims is to be interpreted broadly as applying to sulfur trioxide gas which combines with lead oxide or chloride as well as to the radical $SO_4$, however present or formed. Whether or not lead chloride is formed as an intermediate product which is then converted to lead sulfate is also immaterial, since it is the lead oxide as originally present with which we are concerned, and the reference to lead oxide in the claims is to be considered as covering lead chloride whether initially present or formed during the process, but which is sulfated by the sulfating reagent.

Having thus described the invention, what is claimed as new and desired to secure by Letters Patent is:

1. The method of treating a complex lead and zinc sulfide ore comprising the steps of roasting the ore with air and under low temperature conditions which provide lead oxide and a chloridizable zinc compound, treating the roasted material in a substantially dry and granular condition with a gaseous chloridizing agent and converting the zinc compound to zinc chloride, carrying on the chloridization in the presence of a sulfating reagent capable of and provided for the purpose of converting lead oxide to the sulfate and maintaining conditions which insure that substantially all of the lead oxide which would otherwise remain as such in the ore material is preferentially converted to the sulfate and retained in situ, and thereafter dissolving the zinc and lead salts from the ore residue and recovering the same.

2. The method of treating a complex lead and zinc sulfide ore comprising the steps of roasting the same with air and under conditions which provide lead oxide, a zinc oxygen compound and residual zinc sulfide, thereafter treating the roasted material in a substantially dry granular condition with a reagent including a chloridizing gas capable of converting the zinc compounds to the chloride, and treating the material with sulfur trioxide in a controlled amount and under conditions required to convert substantially all of the lead oxide to the sulfate, while retaining the zinc in the ore material as a chloride, and thereafter dissolving the zinc and lead salts and separating them from the ore residue.

3. The method of claim 2 in which the roasted ore material contains iron oxide and the material is treated with hydrochloric acid gas to form iron and zinc chlorides from the oxides thereof, after which the material is heated with air and in the presence of the sulfating reagent to decompose the iron chloride and form a chloridizing gas.

4. The method of treating a complex lead and zinc sulfide ore comprising the steps of roasting the ore under low temperature oxidizing conditions to provide an ore material containing a zinc-oxygen compound and together with lead oxide and lead sulfate, thereafter treating the roasted material in intermixture with ferric oxide with hydrochloric acid and forming ferric chloride, heating the material in the presence of air and to a temperature at which iron chloride is not stable and forming therefrom a chloridizing gas containing chlorine and ferric oxide, carrying on the chloridizing process in the presence of a sulfur-bearing reagent added for the purpose which is capable of and proportioned for providing sulfur trioxide in amount sufficient for converting the lead oxide to lead sulfate under the oxidizing and chloridizing conditions of the process, and causing the conversion of lead oxide to a compound which is soluble in a hot salt brine, and thereafter dissolving the lead in such a brine.

5. The method of claim 1 in which the sulfating reagent is derived by providing in the ore material one of the group consisting of sulfur, a sulfur oxide, sulfuric acid and a sulfide or sulfate of a metal other than lead.

6. The method of claim 1 in which the sulfating reagent is derived in situ from the sulfide of a metal other than lead and the process is carried on in the presence of oxygen and under such conditions as to form the sulfate radical for combination with lead.

7. The method of claim 1 in which the sulfating reagent is iron sulfide and the process is carried on in the presence of chlorine and oxygen and under such conditions that sulfur trioxide is formed in intimate association with the lead oxide.

8. The method of claim 1 in which the sulfating reagent comprises sulfur trioxide gas.

9. The method of claim 1 in which the sulfating reagent comprises a sulfur compound capable of burning to sulfur dioxide and in which the reaction is carried on in the presence of a catalyst and under conditions which insure that sulfur trioxide is formed and combines with the lead oxide to form lead sulfate.

THOMAS A. MITCHELL.